United States Patent
Dahne-Steuber et al.

(10) Patent No.: US 7,437,704 B2
(45) Date of Patent: Oct. 14, 2008

(54) REAL-TIME GENERATION OF SOFTWARE TRANSLATION

(76) Inventors: Ines Antje Dahne-Steuber, 4433 Campbell St., Kansas City, MO (US) 64110; Marcos Garcia, #16 Dunworth Mews, London (GB) W11 1LE ( * ) Notice: Subject to any disclaimer, the term of this patent is extended or adjusted under 35 U.S.C. 154(b) by 772 days.

(21) Appl. No.: 10/667,895

(22) Filed: Sep. 23, 2003

(65) Prior Publication Data

US 2005/0050526 A1 Mar. 3, 2005

Related U.S. Application Data

(60) Provisional application No. 60/498,282, filed on Aug. 28, 2003.

(51) Int. Cl.
G06F 9/44 (2006.01)
(52) U.S. Cl. .................... 717/100; 704/9; 715/536
(58) Field of Classification Search ......... 717/100–139; 704/9; 175/703, 536; 715/703, 536
See application file for complete search history.

(56) References Cited

U.S. PATENT DOCUMENTS

| | | | | |
|---|---|---|---|---|
| 5,469,463 A | * | 11/1995 | Polich et al. | 714/20 |
| 5,572,668 A | * | 11/1996 | See et al. | 714/38 |
| 5,630,138 A | * | 5/1997 | Raman | 717/162 |
| 5,652,884 A | * | 7/1997 | Palevich | 713/1 |
| 5,664,206 A | * | 9/1997 | Murow et al. | 704/8 |
| 5,682,473 A | * | 10/1997 | Carson et al. | 714/38 |
| 5,731,991 A | * | 3/1998 | Kinra et al. | 702/186 |
| 5,995,984 A | * | 11/1999 | Lau et al. | 715/505 |
| 6,031,990 A | * | 2/2000 | Sivakumar et al. | 717/124 |
| 6,035,121 A | * | 3/2000 | Chiu et al. | 717/141 |
| 6,038,572 A | * | 3/2000 | Schwartz et al. | 707/206 |
| 6,067,639 A | * | 5/2000 | Rodrigues et al. | 714/38 |
| 6,182,279 B1 | * | 1/2001 | Buxton | 717/100 |

(Continued)

OTHER PUBLICATIONS

Meta Lex: Legislation in XML, Alexander Boer et al, IOS Press, 2002, 10 pages.*

(Continued)

*Primary Examiner*—Todd Ingberg
(74) *Attorney, Agent, or Firm*—Shook, Hardy & Bacon L.L.P.

(57) ABSTRACT

Generating language-translated versions of software include a parsing engine to scan original-language versions of software, and detect textual string or other expressions which may require translation for other countries or markets. After testing for prior translation, those strings may be converted to appropriate expressions in other languages, and for instance stored in paired-memory or other format. Users may download the original version of the software, and then install run-time, language-specific resources to tailor the software to their market or country. The run-time, language-specific resources may be or include resource-only dynamic link libraries (dlls). In embodiments the target language into which translation may be made may be automatically detected using the regional settings of the user's machine, or otherwise. Because translation resources for various sets of languages may be generated before the release of the original code, software products may be deployed in various markets and countries at the same time as the original code. Staggered release of localized versions of a software product in one country after the other is therefore not necessary, and software maintenance is made more efficient.

47 Claims, 7 Drawing Sheets

U.S. PATENT DOCUMENTS

| | | | |
|---|---|---|---|
| 6,185,729 B1 * | 2/2001 | Watanabe et al. | 717/100 |
| 6,275,790 B1 * | 8/2001 | Yamamoto et al. | 704/8 |
| 6,288,753 B1 * | 9/2001 | DeNicola et al. | 348/586 |
| RE37,722 E * | 5/2002 | Burnard et al. | 713/1 |
| 6,425,123 B1 * | 7/2002 | Rojas et al. | 717/136 |
| 6,453,462 B1 * | 9/2002 | Meade et al. | 717/124 |
| 6,473,707 B1 * | 10/2002 | Grey | 702/123 |
| 6,507,812 B1 * | 1/2003 | Meade et al. | 704/8 |
| 6,944,846 B2 * | 9/2005 | Ryzhov | 717/116 |
| 7,036,113 B1 * | 4/2006 | Kumhyr | 717/142 |
| 7,127,700 B2 * | 10/2006 | Large | 717/100 |
| 7,152,222 B2 * | 12/2006 | Kumhyr et al. | 717/107 |
| 7,155,443 B2 * | 12/2006 | Kung et al. | 707/101 |
| 7,171,672 B2 * | 1/2007 | Just | 719/330 |

OTHER PUBLICATIONS

Forte Release 2, Building International Applications, 1996, Whole Manual.*
Forte, Forte Programming Guide, Release 3, Chapter 15, 1998.*
Annotated Bibliography on Internationalization and Localization, J.D. Becker, Scientific American, Jul. 1984, pp. 96-107.*

* cited by examiner

REAL-TIME GENERATION OF SOFTWARE TRANSLATION

FIELD OF THE INVENTION

The subject matter of this application is related to the subject matter of U.S. Provisional Ser. No. 60/498,282, filed Aug. 28, 2003, from which application this application claims priority.

FIELD OF THE INVENTION

The invention relates to the field of computer software, and more particularly to techniques for automatically generating language-specific versions of application or other software.

BACKGROUND OF THE INVENTION

The software industry is a global business whose markets encompass various countries, many of which have different languages. For software vendors who intend to ship product into foreign countries, the process of localizing software into different languages can often only begin after the core software development cycle has ended. Vendors have often been unable to translate and then test translations before code is released to those foreign clients. Translated applications may be delivered for example to non-U.S. clients several months later than original US code.

In the industry, the standard approach to delivering a translated localized product is consequently to translate and package each localized product individually. The release of localized products may further be prioritized by importance of the target market. Thus, there may be individually packaged products of productivity software for Germany, Thailand and other countries or markets. The German market may have a higher priority than the Thai or other market. Hence, the German product may be released simultaneously or shortly after the U.S. product, while the Thai or other product may be released months later. This is called a tiered approach.

There are several downsides to the tiered approach. Individually packaged products may often have different defects. Having a set of differing versions of code may make it more difficult to troubleshoot and resolve issues. If an issue is identified and resolved, it may only be resolved for one individual language package. The tiered approach may also require the localization team to spend months or longer with one product at a time, rather than delivering all localized products simultaneously. Development resources may therefore be taken away from subsequent releases.

Another, less common approach to delivering localized software products is to release one core source code version to all customers, and add components that display translations at run time if the source code detects a regional setting that is different from the regional setting of the source code. The advantages to this approach include that only one version of source code needs to be supported and maintained. The translated components may consist largely or only of resource-only dynamic link libraries (dlls) that contain no additional functionality.

Therefore, those components do not require processing time that could have an impact on application performance. Typically, these components do not cause application bugs or issues similar to issues caused by source code. However, even vendors employing this run-time approach usually focus on releasing one localized version after another on a per-product basis, and on a defined schedule. No more than one localized product line may be shipped simultaneously.

A need consequently exists for a translation process that allows for a real time translation release of all available products, without a need to prioritize languages or markets or to schedule staggered releases of the software product.

SUMMARY OF THE INVENTION

The invention overcoming these and other problems in the art relates in one regard to a system and method for real-time translation of applications and other software products, in which a parsing engine may accept a finished application or other source code as an input in an original language, and automatically generate one or more language-translated versions of the software product. According to the invention in one regard, the language-translated version of the software may have internationalization rules automatically enforced, to help prevent errors and ensure product consistency across markets. Because the parsing engine and related components may cooperate to quickly and consistently transform source code to various languages for various destination markets, translated software packages may be generated and deployed in real time with the original code release. Vendors may thus release software products without having to allow for additional localization time in the coding cycle, and without using a tiered approach to different markets.

BRIEF DESCRIPTION OF THE DRAWINGS

The invention will be described with reference to the accompanying drawings, in which like numbers reference like elements.

DETAILED DESCRIPTION OF EMBODIMENTS

Figure 1:
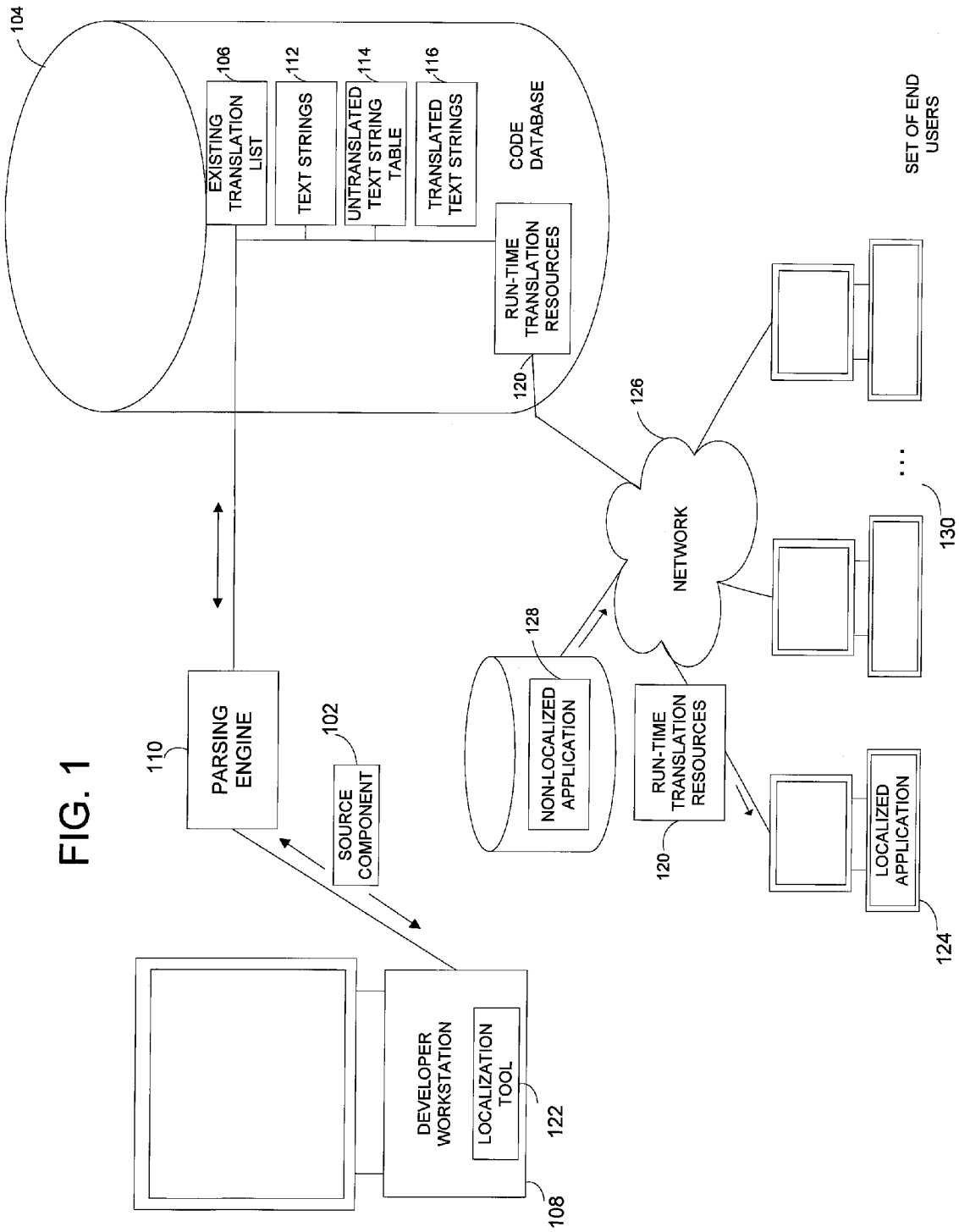
FIG. 1 illustrates an overall network architecture in which an embodiment of the invention may operate.

An illustrative environment in which an embodiment of the invention may operate is shown in FIG. 1, in which a software developer, programmer or others may operate a developer workstation 108 communicating with a code database 104 and other resources to translate textual strings or other language-specific portions of a source component 102 into one or more target languages. The source component 102 may be or include, for instance, a software application such as a word processing, spreadsheet, database or other application, a portion or component of a software application such as a function, module, class or routine, or other code or software resources.

According to the localization processing of the invention in one regard, a developer or other user may transmit the subject source component 102 to a parsing engine 110. The parsing engine 110 may in turn communicate with the code database 104 hosting one or more translation resources used to generate language-tailored versions of the source component 102. According to embodiments of the invention, the code database 104 may be established for the storage, translation and dissemination of original application and other code and other resource. As illustrated, the code database 104 may among other things host an existing translation list 106 of all text strings 112, such as English language or other strings, derived from one or more source component 102 that have been previously translated for code localization or other purposes.

The code database 104 may allow for flexible activation of products and languages according to countries or markets, since not all source code products may be suitable for all global markets. The existing translation list 106 may therefore include the ability to adjust the entries depending on source and target languages and intended markets. The existing translation list 106 may, for example, contain, alter or expose different sets of source text depending on the source or target country or language.

According to embodiments of the invention, if a developer or other user checks in a new or modified source component 102 for processing, parsing engine 110 may be activated and scan the source component 102 for textual expressions or other language-dependent fields which may be presented to the application user. For example, the parsing engine 110 may detect modules or routines such as those which may be labeled "GetMessages", "BuildMessages" or "FormCaptions", as well as other resources, files or content. Other modules, routines, resources or whole or partial code may be scanned or detected.

Once the parsing engine 110 has identified all text strings 112 embedded in candidate modules or routines, the parsing engine 110 may query the existing translation list 106 to determine whether any of the text strings 112 have been translated before. In embodiments, one or more of the text strings 112 may be have been translated or stored in connection with the subject source component 102, or with other source components but made available for reuse.

If all text strings 112 in the current source component 102 have been translated before, no further action may be taken. If some of the text strings 112 have not been translated, those strings may be placed in a separate untranslated text string table 114. In embodiments developers or others may have the ability to access the untranslated text string table 114, for instance via a front-end interface, and retrieve any untranslated text strings 112, for instance in .txt or other format.

Once retrieved, the developer or others may send those text strings 112 to an appropriate translation facility for translation. That facility may be or include a translation agency or bureau performing manual, automated or other translation service. After translation, translated text strings 116 may be returned and communicated for storage in code database 104, for instance in a TRADOS translation format known to persons skilled in the art, or in other memory, media or format. TRADOS "memory" for example stores every pair of translated source and target text strings for consistent use, ensuring that identical text strings 112 need only be translated once, regardless of their origin. The developer or other user in embodiments may select which target language in which the translated text strings 116 may be retrieved, via parsing engine 110 and a front-end interface executing on developer workstation 108, or otherwise.

If a decision to translate a new source component 102 is made, the source component 102 or related components in a complete application or other product may be added to the code database 104. The code database 104 may check for any new untranslated text strings 112 within the new source component 102 immediately, and generate one or more translated text strings 116 in very little time if such strings are detected. Likewise, in embodiments if the translation of certain software components or products is discontinued, the corresponding translated text strings 116 may be promptly deactivated in the database. Once any new translated text strings 116 have been retrieved, they may be added to the existing translation list 106 and will not require translation again.

According to the invention in another regard, once translated text strings 116 have been generated and projects or stages of projects have been built successfully, the parsing engine 110 communicating with code database 104 may generate run-time translation resources 120 for the subject source component 102. In embodiments, the run-time translation resources 120 may be, include or interface to resource-only dlls from all related software components or modules, such as Visual Basic, C++, Java or other code, modules or other resources. The run-time translation resources 120 may be or include the data or other components that will contain and display translated text at runtime. In embodiments, the run-time translation resources 120 may not contain any additional functionality. This in one regard may help to ensure that the end-user's computer is not unnecessarily loaded. Furthermore, in another regard there may be little or no functionality in the run-time translation resources 120 that can interfere with or cause errors in the overall software product's functionality.

In embodiments, the parsing engine 110 may generate at least two types of run-time translation resources 120 for each piece of translated software. Those types of run-time translation resources 120 may be or include at least dlls for pseudo translation, and translation dlls (sometimes referred to as enu.dlls). Dlls for pseudo translation may place a placeholder expression, such as asterisks or other expressions, in front of strings displayed at runtime if the user's regional settings are changed to an unsupported language. Such flags may help developers review and test the translated product further.

Translation dlls may likewise be generated and provided to the developer or other users. Those translation dlls may employ a naming convention, for example such that every dll, .exe, .ocx or other component of the source code receives a corresponding component with the same name plus a fixed extension, such as enu.dll. Thus, for example, for "Powerchart.exe" the corresponding translation component may be designated Powerchart_enu.dll. The translation dlls (enu.dlls) may then be loaded into a localization tool 122, such as the commercially available Visual Localize (VisLoc), or other off-the-shelf or other localization tool. The localization tool 122 may retain previous versions of the same source component 102 to assure that strings that have been previously translated do not need to be translated again.

Once the new components have been uploaded, the localization tool 122 may allow the export of all text strings that have not been translated since the upload of the last version. This string export can be translated automatically, for example by using the commercially available TRADOS translation memory that retains all the strings that are still untranslated in coherent storage (e.g. VisLoc), as noted above. The translations may be imported into the localization tool 122 and translation dlls may be generated. The translation dlls may be named so that the appropriate regional settings can detect and call them. For example for German-language products, the translation dlls may be renamed to "_deu.dll". Once generated and named, the run-time translation resources 120 may be communicated to the software factory or other facility with validated translated components for packaging. Once translated, corrected and transmitted, the product or products incorporating translated text strings 116 may be assembled and packaged, for instance automatically according to a bill of material.

As likewise illustrated in FIG. 1, when an end user in a set of end users 130 downloads a new release of a product generated according to the invention, in embodiments they may be first prompted to download the original, non-localized application 128 in an original language version. After a successful download via network 126, which may be or include the Internet or related connections, the end user in the set of end users 130 may be prompted to download appropriate translation material for their market to import or install to generate the ultimate localized application 124.

In configuring that download, the vendor of the product may be able to determine which language version to provide to the end user, based on login or other information supplied by or related to the end user. For example, in embodiments the regional settings on the end user's computer may be detected to identify a target language or languages. In other embodiments, the user may be queried via a dialog box or otherwise for their language preference. In the installation process, a link to a site in or connected to network 126 for downloading run-time translation resources 120 may appear only after the successful download or registration of the original non-localized application 128, itself. According to the invention in one regard, the end user therefore only download run-time translation resources 120 after successfully downloading the original-language non-localized application 128, as opposed to accidentally or intentionally only downloading run-time translation resources 120 by themselves, with no executable functionality.

According to the invention in another regard, to permit the real-time release of localized software without interfering with the engineering of underlying code, the translation and validation processes of the source component 102 may thus be effectively separated. Validation of translated applications or components therefore may be more efficient when source code is mature, and it becomes highly likely or certain that new functionality will actually be incorporated in the source code of non-localized application 128. This may typically be the case a few weeks before the release date of source software, at which point in the development cycle it may not be feasible to conventionally translate all applications and test the various translations of those applications for prompt release.

Figure 2:
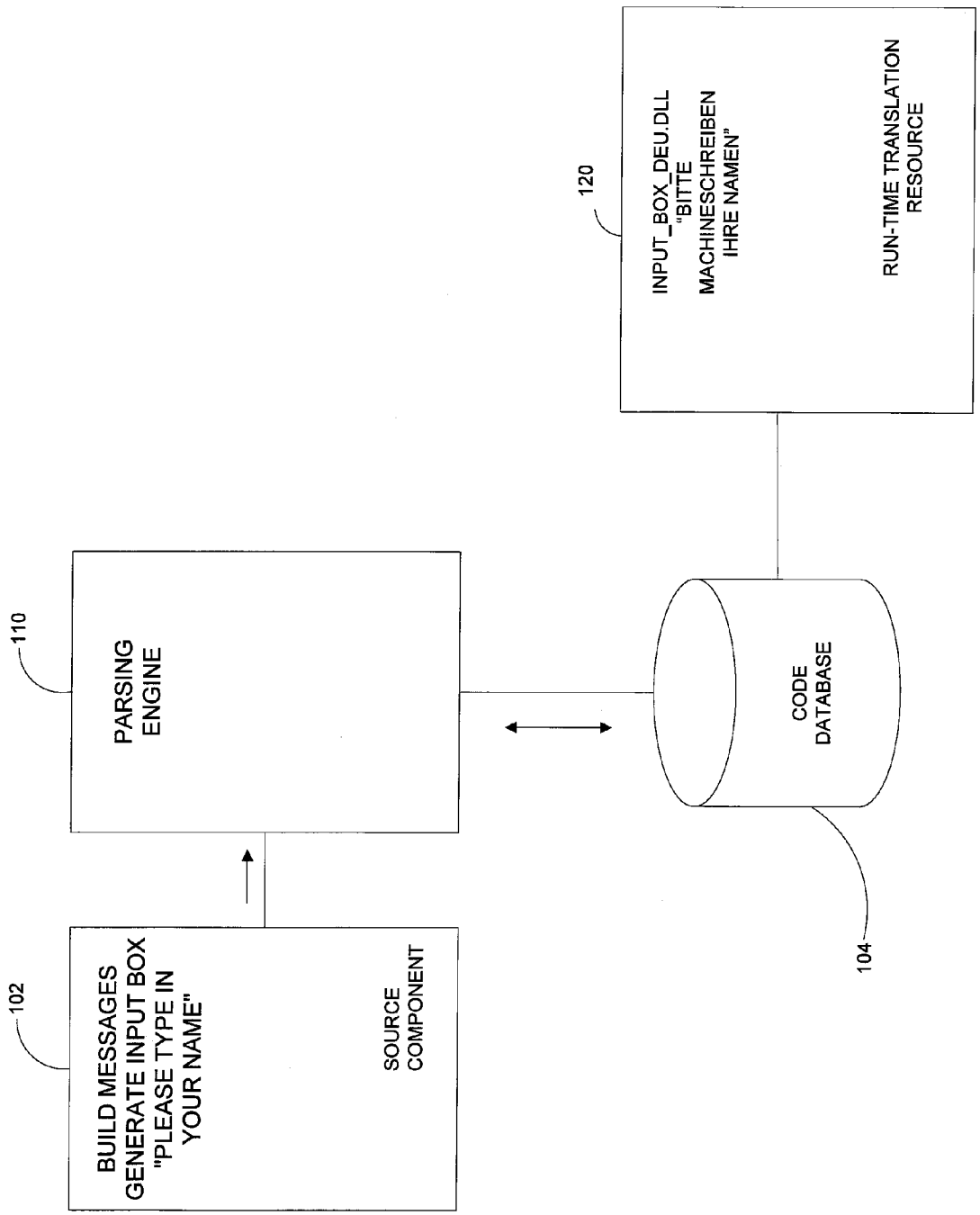
FIG. 2 illustrates the generation of a translated output based on a parsing action according to an embodiment of the invention.

As illustrated in FIG. 2, once a source component destined for incorporation into an ultimate localized application 124 has been translated and debugged, the run-time translation resources 120 may present or contain a language-tailored version of user prompts, dialog boxes and other user interface or other text. So for instance a user query originally appearing in English in the source component 102 may be transparently converted to equivalent translated expressions in German or other languages communicated, referenced or embedded in run-time translation resources 120, as shown.

According to the invention in another aspect, code internationalization standards may in embodiments be enforced or followed to assure that localized products are validated to comparable quality as the original source component 102. If quality checks are not enforced, text may unintentionally appear in untranslated form in the wrong language to the end user, or certain functionality may not work as intended.

Figure 3:
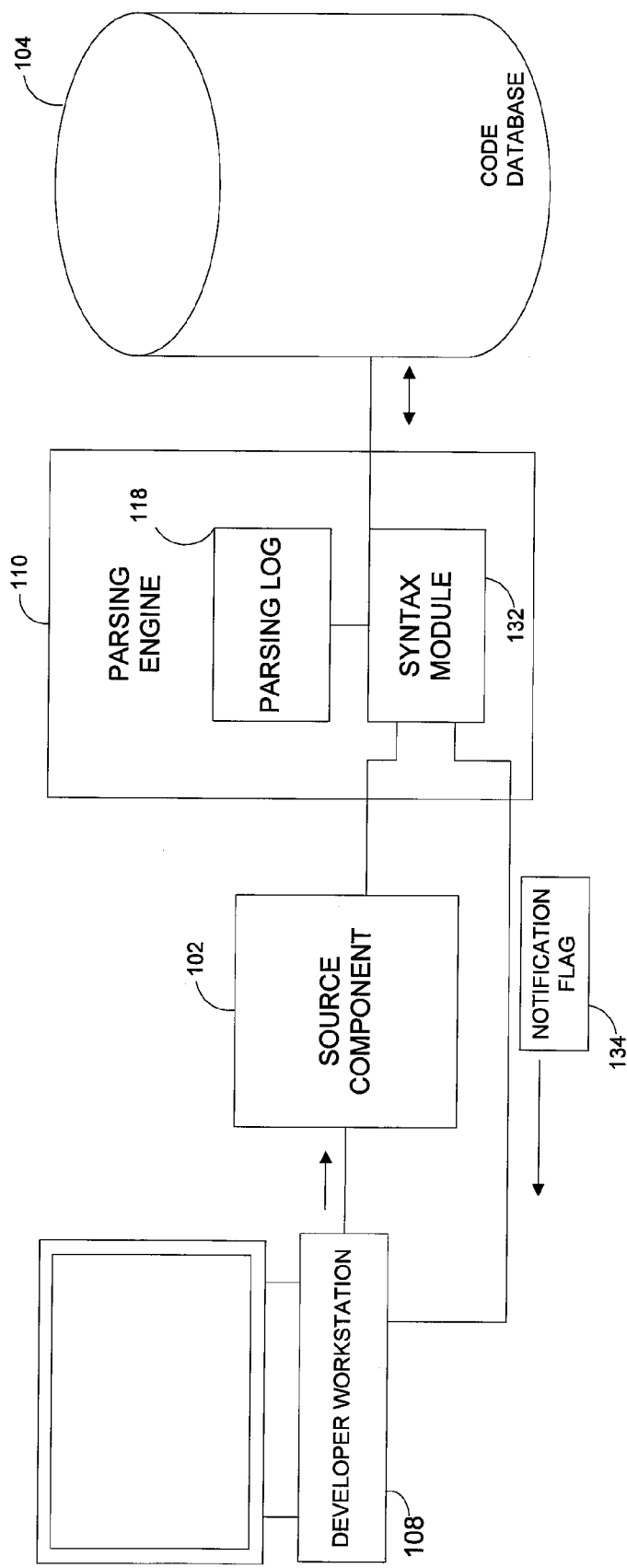
FIG. 3 illustrates internationalization processing according to an embodiment of the invention.
Figure 4A:
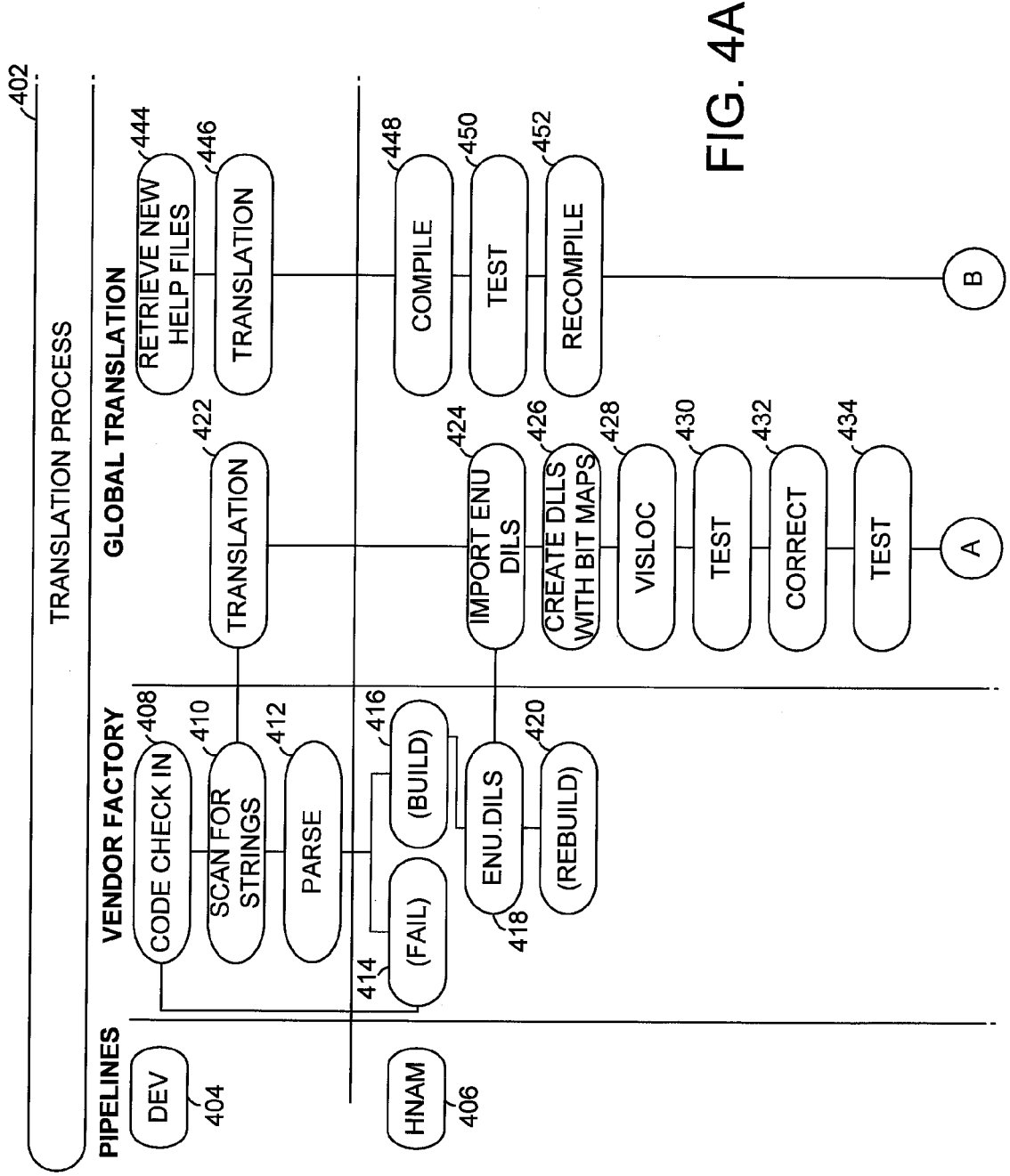
FIG. 4 illustrates a flowchart of overall translation processing according to an embodiment of the invention.
Figure 4B:
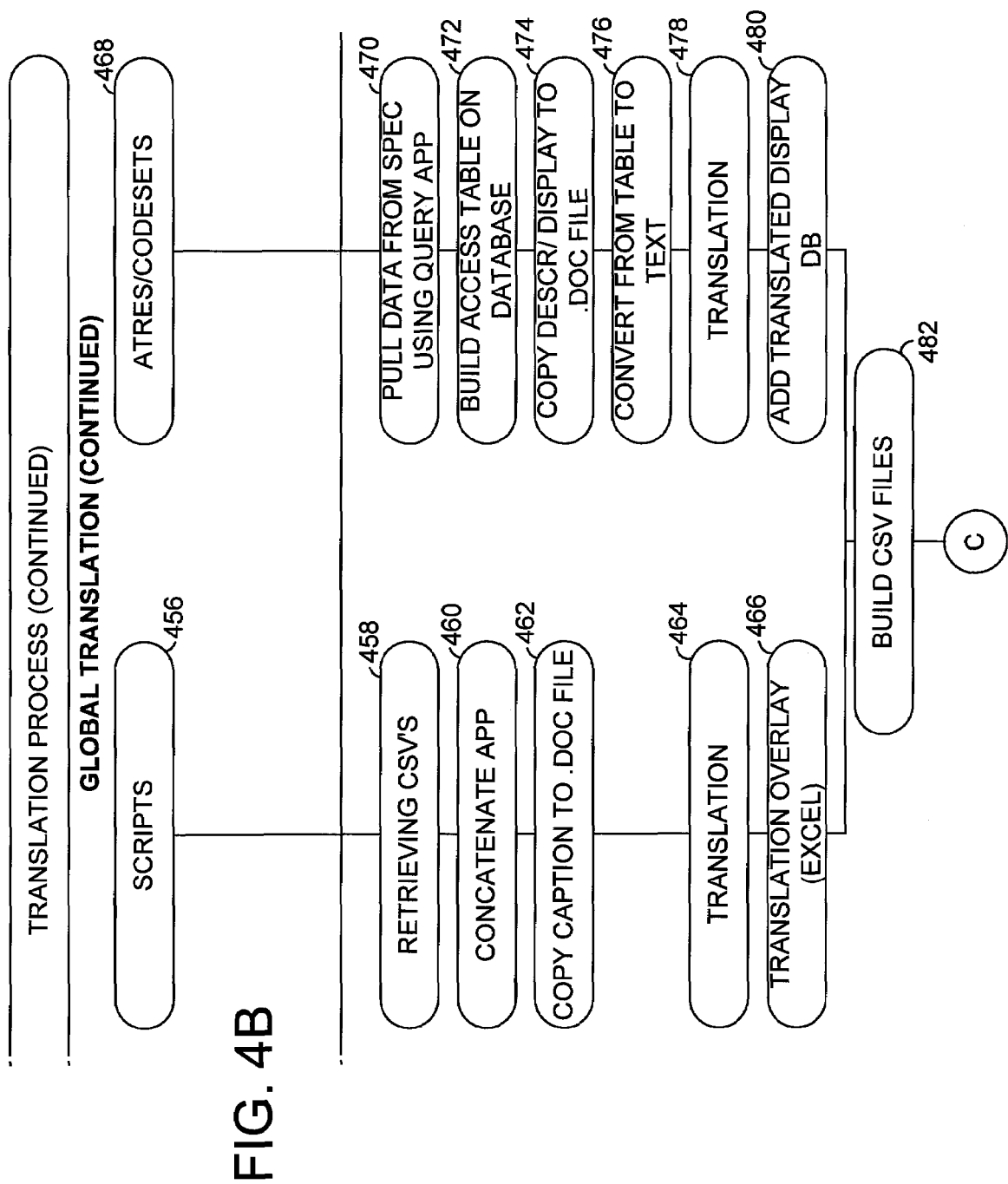
Figure 4C:
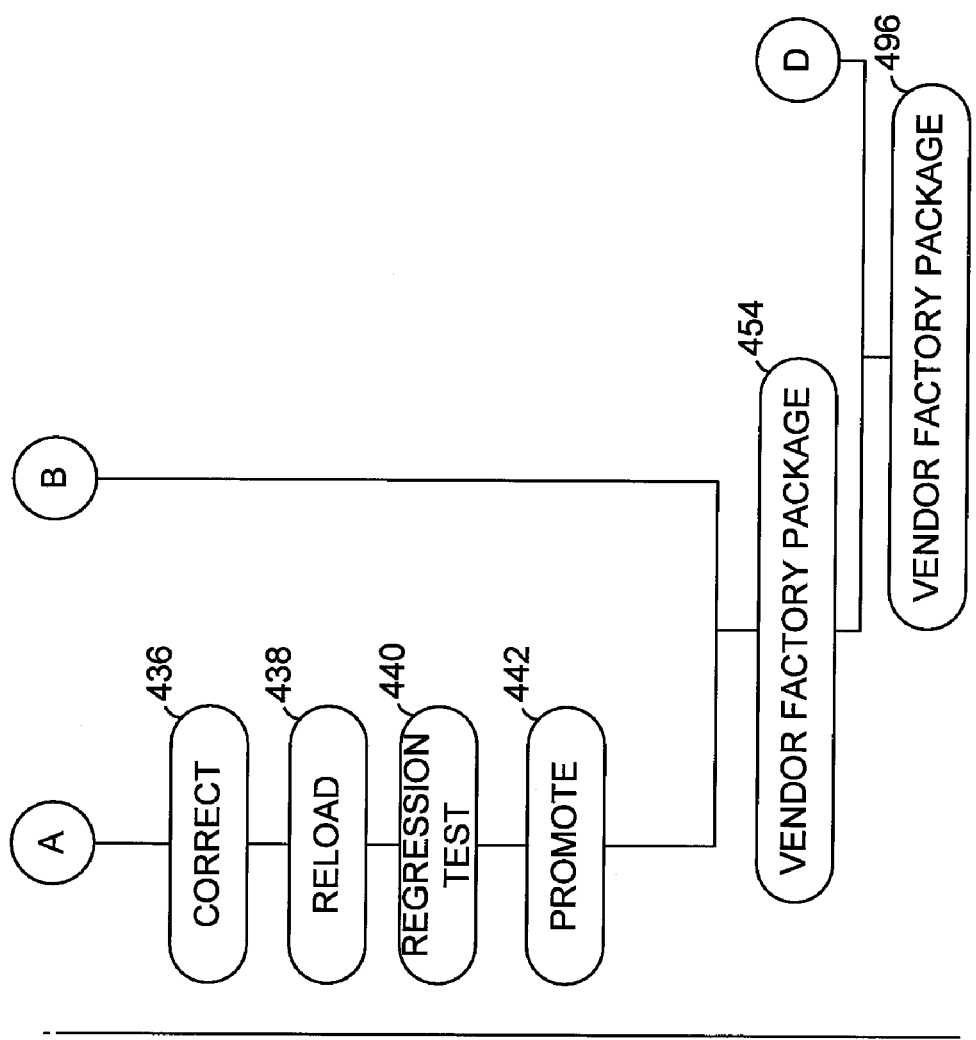
Figure 4D:
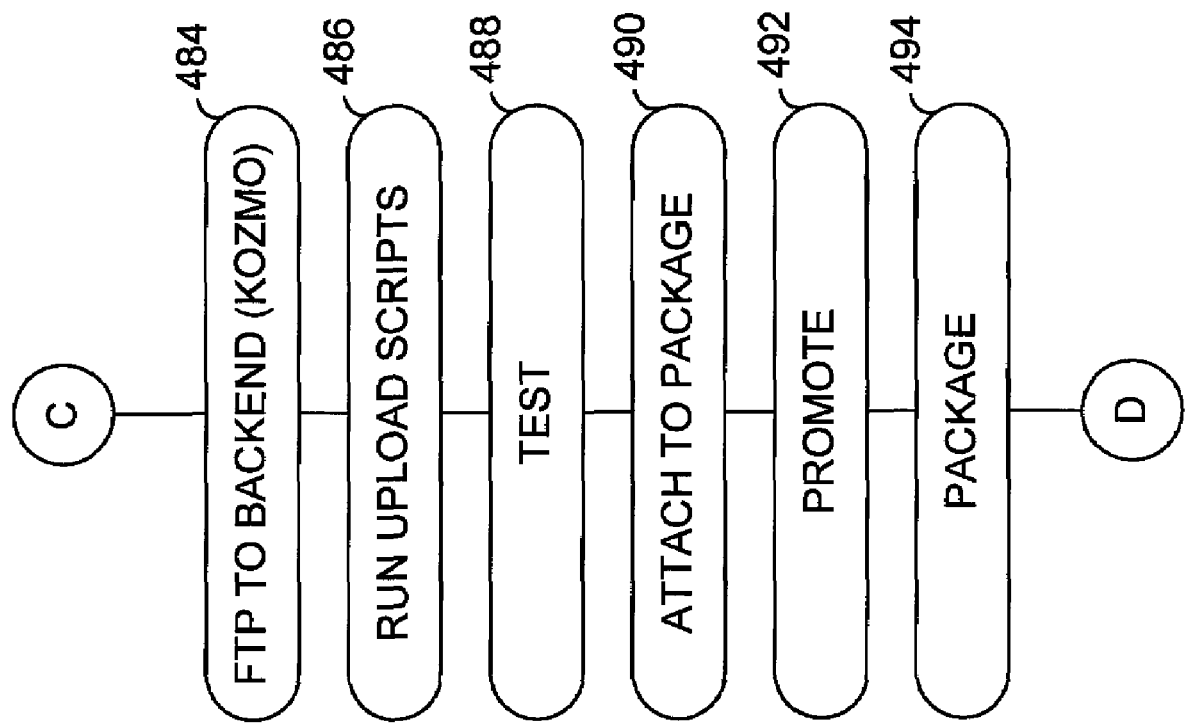

As illustrated in FIG. 3, the parsing engine 110 according to the invention may in embodiments therefore additionally analyze the syntax of a given source component 102. The parsing engine 110 may for those purposes in embodiments also include both a parsing log 118 and a syntax module 132. Parsing log 118 may reflect the textual strings 112 detected in source component 102, the target language or languages to be generated and other information. The syntax module 132 may contain or be capable of accessing code internationalization standards or rules for various programming languages, such as Visual Basic, Visual C++, Java or other languages or platforms. Those standards or rules may include, for example, International Standards Organization (ISO), European Union (EU) or other standards, requirements or protocols.

The syntax module 132 may scan the translation or translation-in-progress of source component 102 and detect translation irregularities. When irregularities are trapped in this fashion, the developer or others who checked the source component 102 may receive a notification flag 134 and a copy of the parsing log 118. That developer then may review and correct the issue, and check the updated source component 102 in again. If no further syntactical issues are found, the translated software can be output successfully. If internationalization errors are returned or returned again for a source component 102 which was checked in, the code build may not complete successfully. In embodiments, parsing engine 110 and other components according to the invention may also be configured to except entire products or single components of projects from being parsed and checked for internationalization compliance, if circumstances dictate.

According to the invention in one other regard, code internationalization and the creation of functionality may therefore be integrated. The automated quality control process according to embodiments of the invention may fail code that is not properly internationalized, allowing developers and vendors to trap and avoid internationalization issues from the beginning. Additional developer teams dedicated to code internationalization may therefore be unnecessary.

Overall translation processing according to an embodiment of the invention in one regard is illustrated in FIG. 4. In step 402, translation processing may begin. In step 404, the original source component 102 may be developed, for instance by a developer or developer team. In step 406, a host name (hnam) may be identified for the code database 104 into which source component 102, translation text strings and other code or resources may be stored, for instance in a relational or other database. In step 408, the source component 102 may be checked in to the code database 104, for instance by a developer via a secure or other connection over the Internet, or otherwise.

In step 410, the source component 102 may be scanned for the presence of existing translated text strings 116, for instance by checking existing translation list 106. If translated text strings 116 corresponding to text in the source component 102 are available, processing may proceed to step 424 in which run-time translation resources 120, such as dll files or others, may be imported. After those resources are imported, processing may proceed to step 418 in which run-time translation resources 120 may be received. In step 420, the localized component 124 may be built or rebuilt to include the language-specific run-time translation resources appropriate to the given market or country.

If in step 410 no existing translated text strings 116 are detected, processing may proceed to step 412, in which parsing engine 110 may process text strings 112 to generate translated text strings 116. If parsing engine 110 fails to associate appropriate translated text strings 116 to text strings 112 or otherwise fails to complete that operation in step 414, processing may return to step 408 to receive a check-in of an updated or other source component 102. In embodiments developers or others may be notified of that failure. If the parsing engine however successfully parses text strings 112 in step 412, processing may proceed to step 416 in which one or more parts of localized component 124 may be built, followed by receipt of any remaining run-time translation resources 120 and rebuilding of localized component 124 in step 420.

In step 424, after the run-time translation resources 120 are imported, processing may likewise proceed to step 426 in which additional run-time translation resources, such as graphically enabled translated text strings 116, may be generated. For instance, translated text strings 116 may be combined with bit-mapped or other graphics to display dialog boxes, warning messages or other content. In step 428, the source component may be further developed or debugged using localization tool 122, for instance the commercially available VisLoc or other tools or utilities. In step 430, the build generated by localization tool 122 may be tested for compliance with internationalization standards, for instance internal or external internationalization protocols or standards.

In step 432, corrections or updates to the localized component 124 may be performed as appropriate. In step 434, testing for correct internationalization may be repeated, followed by additional corrections to translated text strings 116 or other components. In step 436 any remaining corrections may be made. In step 438 the localized component 124 may be reloaded and subjected in step 440 to a regression test. In step 442 assuming no further internationalization issues remain the localized component 124 may be promoted to finished status. In step 454 localized component 124 may be delivered to or incorporated in a vendor factory package and shipped, made available for download or otherwise distributed.

In step 444, help files associated with source component 102 may be retrieved, followed by translation of those files, for instance by using a translation bureau or other facility, in step 446. In step 448, the localized component 124 may be compiled with the translated text strings 116 related to those help or other files. In step 450, operation of the localized component 124, such as an application program or other language-tailored product, may be test for accurate presentation of help or other files. In step 452, the localized component may be recompiled to update any corrections or modifications, and in step 454 the vendor factory package of localized component 124 may be completed, shipped, made available for download or otherwise distributed.

In step 456, database scripts or related resources associated with localized component 124 may be accessed and retrieved in step 458 for internationalized translation or other processing. Those scripts, files or other resources may include, for instance, character separated interface (CSV) databases or supporting scripts. In step 460, concatenation of the localized component 124 with supporting CSV databases or related Perl or other scripts may be performed. In step 462, translation captions may be copied to a ".doc" or other file. In step 464, a translation of text strings 112 contained in or related to CSV database entries or related scripts may be performed to generate translated text strings 116 or other output. In step 466, the translated text strings 116 or other translation output may be overlayed in spreadsheet (for example Microsoft Excel™) or other format.

In step 482 CSV or other database files may be built, and in step 484 those files may be communicated to a backend storage server or other resource, for instance via file transfer protocol (FTP) over the Internet or other networks. In step 486, upload scripts may be executed. In step 488, the CSV or other database, database entries, supporting scripts or other resources or modules may be tested, and after validation in step 490 those resources may be attached to the localized software product package or other object. In step 492, after testing or validation is complete, the assembled software package incorporating localized component 124 may be promoted to final or shipping version status, after which that package may be packaged for shipment, made available for download or otherwise distributed in step 494. In step 496, an install test may be performed to ensure that public customers may connect to code database 104 or other sites and retrieve and install software packages incorporating appropriate localized component 124.

In step 468, according to the invention in another regard an application task request (ATR), which may be a code identifying software applications or other software, along with codesets which according to the invention may be or include entries on a database table that may be called by applications, may be accessed. In step 470, data from application specifications or other codesets may be pulled from a database. In step 472, an access table may be built on the code database 104 or other database. In step 474, the resulting textual description or display information may be copied to a ".doc" or other file or entry. In step 476, the codesets or other data may be converted to textual format. In step 478, that set or sets of text strings 112 may be translated into a target language. In step 480, translated text strings 116 or other translated display data corresponding to that original data may be added to the code database 104 or other storage. Processing may then proceed to steps 482 through 496, operating as described above.

The foregoing description of the invention is illustrative, and modifications in configuration and implementation will occur to persons skilled in the art. For instance, while the invention has generally been described in terms of a single code database 104 servicing developer language conversions and end-user localization, in embodiments multiple databases or other data stores could be employed. In embodiments, for example one or more database may be dedicated to access by end users initializing software for local markets, while a separate one or more database may be dedicated to developers building the internalized code.

Similarly, while the invention has in embodiments been described as generating translations and related data using one parsing engine 110, in embodiments the parsing logic and related hardware or software may be distributed among multiple servers or other resources. Other hardware, software or other resources described as singular may in embodiments be distributed, and similarly in embodiments resources described as distributed may be combined. Further, while illustrative text translations were generally described as mapping one textual string to one target textual string, in embodiments further translations to other languages may in instances be possible, or localization to multiple languages in one software package may be performed. The scope of the invention is accordingly intended to be limited only by the following claims.

What is claimed is:

1. A method for generating a software translation, comprising:
   receiving a source software component;
   associating run-time translation resources from a group of language translation sets with the source software component; and
   storing the run-time translation resources for selective installation in a software application associated with the source software component, the source software component subjected to an automated quality control, the automated quality control accessing one or more code internationalization standards and preventing completion of a code build where the source software component is not properly internationalized according to the one or more code internationalization standards.

2. A method according to claim 1, wherein the source software component comprises application code.

3. A method according to claim 1, wherein the run-time translation resources comprise dynamic link libraries.

4. A method according to claim 3, wherein the dynamic link libraries comprise nonexecutable resources.

5. A method according to claim 4, wherein the non-executable resources comprise translated text strings.

6. A method according to claim 5, wherein the group of language translation sets comprises a list of translated text strings in a plurality of languages.

7. A method according to claim 6, wherein the group of language translation sets are accessible simultaneously.

8. A method according to claim 1, wherein the selective installation is executed via a network connection.

9. A method according to claim 1, further comprising syntactically parsing the source component and the set of run-time translation resources.

10. A method according to claim 1, wherein the storing comprises storing run-time translation resources in a database.

11. A method according to claim 1, wherein the selective installation of the run-time translation resources comprises testing for regional settings on a client machine.

12. A system for generating a software translation, comprising:
  an input interface receiving a source software component;
  a parsing engine, communicating with the input interface, the parsing engine associating run-time translation resources from a group of language translation sets with the source software component; and
  code storage, communicating with the parsing engine, the code storage storing the runtime translation resources for selective installation in a software application associated with the source software component, the source software component subjected to an automated quality control, the automated quality control accessing one or more code internationalization standards and preventing completion of a code build where the source software component is not properly internationalized according to the one or more code internationalization standards.

13. A system according to claim 12, wherein the source software component comprises application code.

14. A system according to claim 12, wherein the run-time translation resources comprise dynamic link libraries.

15. A system according to claim 14, wherein the dynamic link libraries comprise nonexecutable resources.

16. A system according to claim 15, wherein the non-executable resources comprise translated text strings.

17. A system according to claim 16, wherein the group of language translation sets comprises a list of translated text strings in a plurality of languages.

18. A system according to claim 17, wherein the group of language translation sets are accessible simultaneously.

19. A system according to claim 12, wherein the selective installation is executed via a network connection.

20. A system according to claim 12, wherein the parsing engine syntactically parses the source component and the run-time translation resources.

21. A system according to claim 12, wherein the code storage comprises a database storing the run-time translation resources.

22. A system according to claim 12, wherein the selective installation of the run-time translation resources comprises testing for regional settings on a client machine.

23. A system for generating a software translation, comprising:
  input means for receiving a source software component;
  parsing means, communicating with the input means, the parsing means associating runtime translation resources from a group of language translation sets with the source software component; and
  storage means, communicating with the parsing means, the storage means storing the run-time translation resources for selective installation in a software application associated with the source software component to a tangible computer-readable medium, the source software component subjected to an automated quality control, the automated quality control accessing one or more code internationalization standards and preventing completion of a code build where the source software component is not properly internationalized according to the one or more code internationalization standards.

24. A system according to claim 23, wherein the source software component comprises application code.

25. A system according to claim 23, wherein the run-time translation resources comprise dynamic link libraries.

26. A system according to claim 25, wherein the dynamic link libraries comprise nonexecutable resources.

27. A system according to claim 26, wherein the non-executable resources comprise translated text strings.

28. A system according to claim 27, wherein the group of language translation sets comprises a list of translated text strings in a plurality of languages.

29. A system according to claim 28, wherein the group of language translation sets are accessible simultaneously.

30. A computer-readable medium, the computer-readable medium being readable to execute a method for generating a software translation, the method comprising:
  receiving a source software component;
  associating run-time translation resources from a group of language translation sets with the source software component; and
  storing the run-time translation resources for selective installation in a software application associated with the source software component, the source software component subjected to an automated quality control, the automated quality control accessing one or more code internationalization standards and preventing completion of a code build where the source software component is not properly internationalized according to the one or more code internationalization standards.

31. A computer-readable medium according to claim 30, wherein the source software component comprises application code.

32. A computer-readable medium according to claim 30, wherein the run-time translation resources comprise dynamic link libraries.

33. A computer-readable medium according to claim 32, wherein the dynamic link libraries comprise non-executable resources.

34. A computer-readable medium according to claim 33, wherein the non-executable resources comprise translated text strings.

35. A computer-readable medium according to claim 34, wherein the group of language translation sets comprises a list of translated text strings in a plurality of languages.

36. A computer-readable medium according to claim 35, wherein the group of language translation sets are accessible simultaneously.

37. Run-time translation resources for incorporation into a non-localized application to generate a language-translated version of the non-localized application, the run-time translation resources being generated according to a method comprising:

receiving a source software component;

parsing the source software component for language-dependent content;

associating the run-time translation resources with the source software component based on the parsing of the source software component; and storing the run-time translation resources for selective installation in a software application associated with the source software component, the source software component subjected to an automated quality control, the automated quality control accessing one or more code internationalization standards and preventing completion of a code build where the source software component is not properly internationalized according to the one or more code internationalization standards.

38. The run-time translation resources according to claim 37, wherein the source software component comprises application code.

39. The run-time translation resources according to claim 37, wherein the run-time translation resources comprise dynamic link libraries.

40. The run-time translation resources according to claim 39, wherein the dynamic link libraries comprise non-executable resources.

41. The run-time translation resources according to claim 40, wherein the non-executable resources comprise translated text strings.

42. The run-time translation resources according to claim 41, wherein the associating of the run-time translation resources comprises selecting from a list of translated text strings in a plurality of languages.

43. The run-time translation resources according to claim 42, wherein the run-time translation resources associated with the plurality of languages are accessible simultaneously.

44. A localized application, the localized application being generated according to a method comprising:

selectively receiving run-time translation resources from a group of language translation sets, the group of language translation sets being at least substantially simultaneously accessible;

incorporating the run-time translation resources in the localized application, prior to the localized application receiving the run-time translation resources, the localized application being subjected to an automated quality control, the automated quality control accessing one or more code internationalization standards and preventing completion of a code build where the localized application is not properly internationalized according to the one or more code internationalization standards; and storing the run-time translation resources as incorporated in the localized application.

45. A localized application according to claim 44, wherein the run-time translation resources comprise dynamic link libraries.

46. A localized application according to claim 45, wherein the dynamic link libraries comprise non-executable resources.

47. A localized application according to claim 46, wherein the non-executable resources comprise translated text strings.

\* \* \* \* \*